May 16, 1933.   A. H. WOODWARD ET AL   1,909,141
CHECK WRITER
Filed June 24, 1931   7 Sheets-Sheet 2
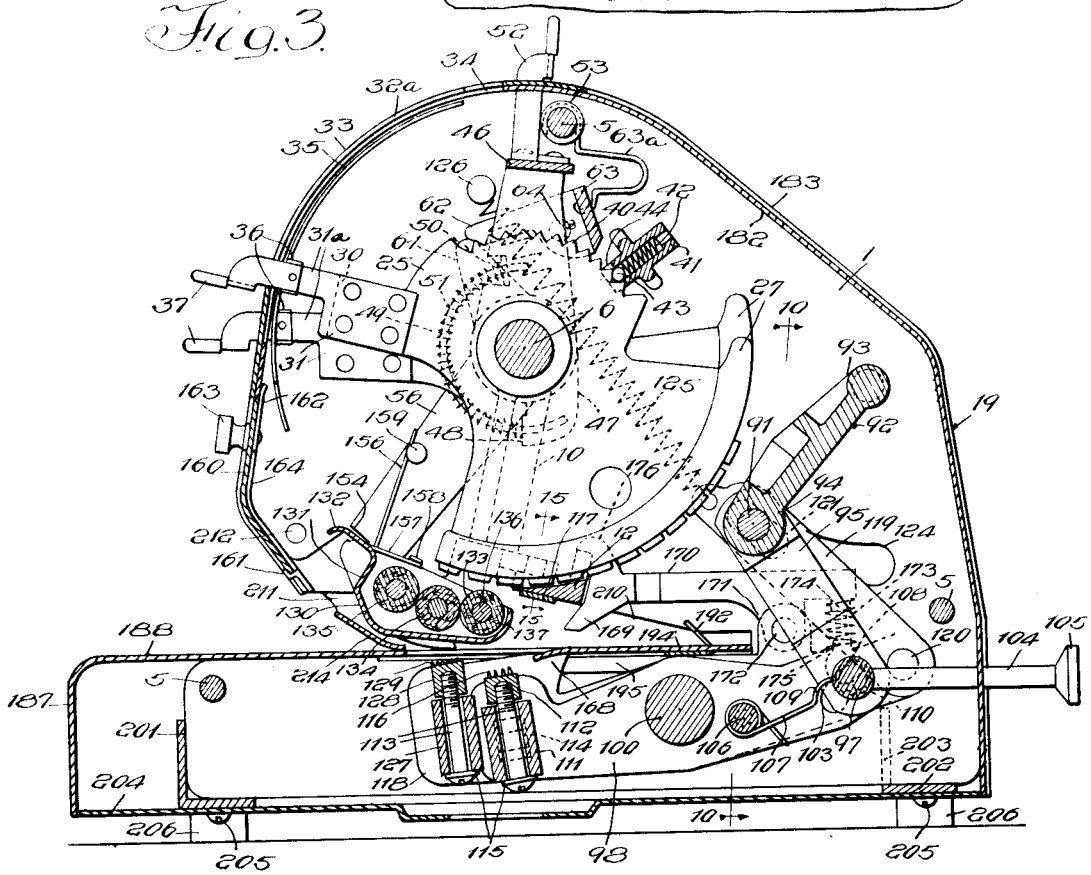
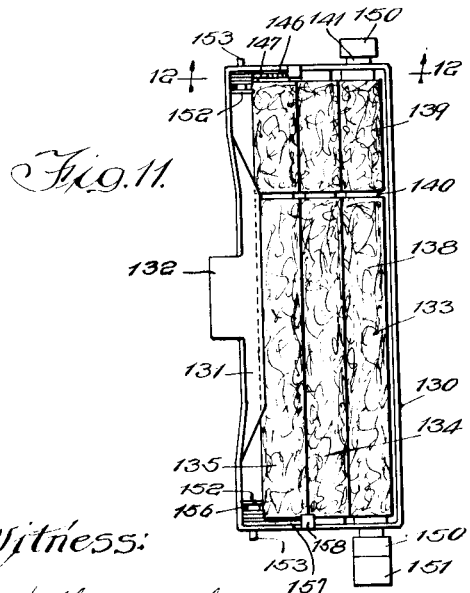
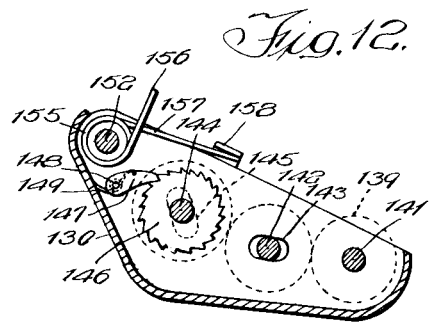
Inventors
Arthur H. Woodward
William E. Richmond May 16, 1933.    A. H. WOODWARD ET AL    1,909,141
CHECK WRITER
Filed June 24, 1931    7 Sheets-Sheet 3
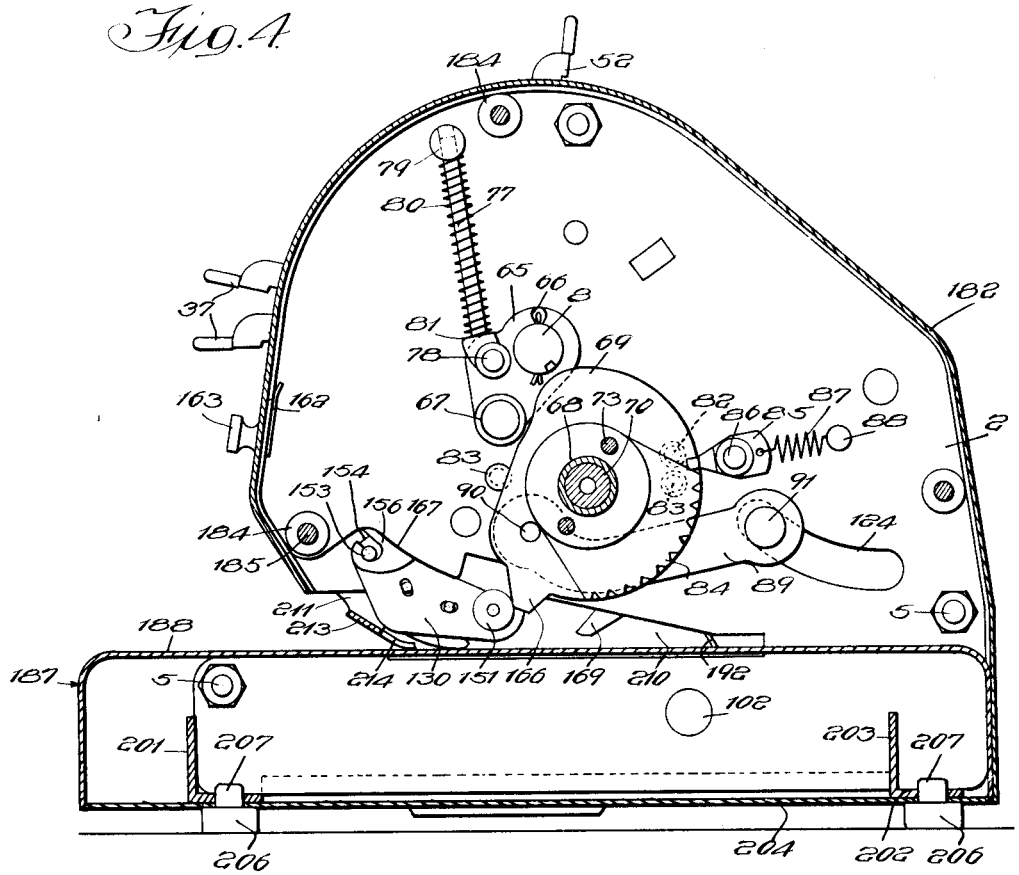
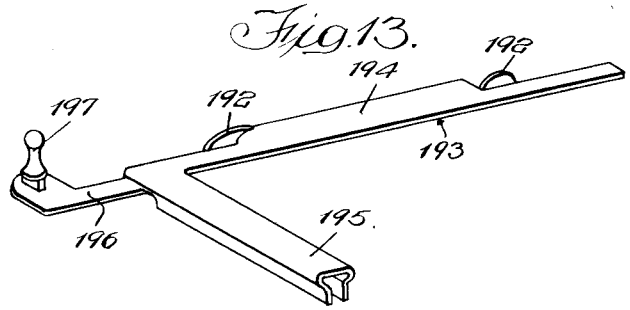
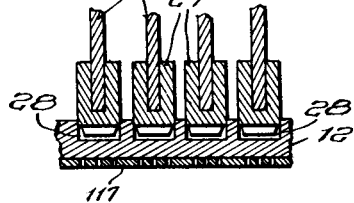
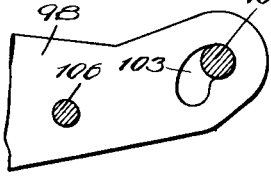
Inventors
Arthur H. Woodward
William E. Richmond

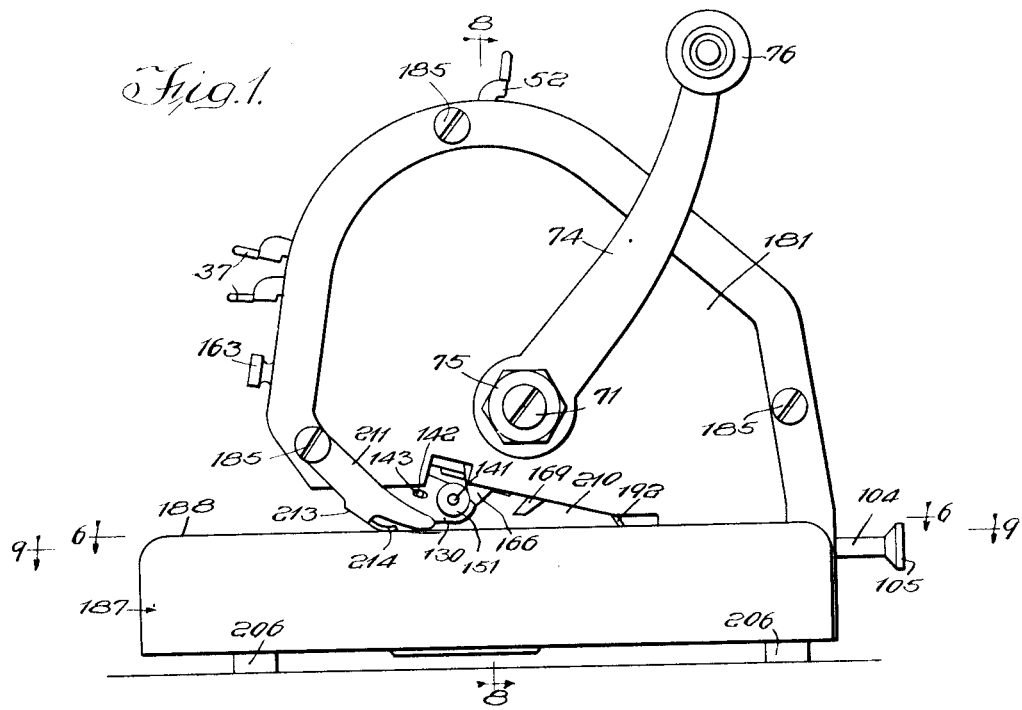
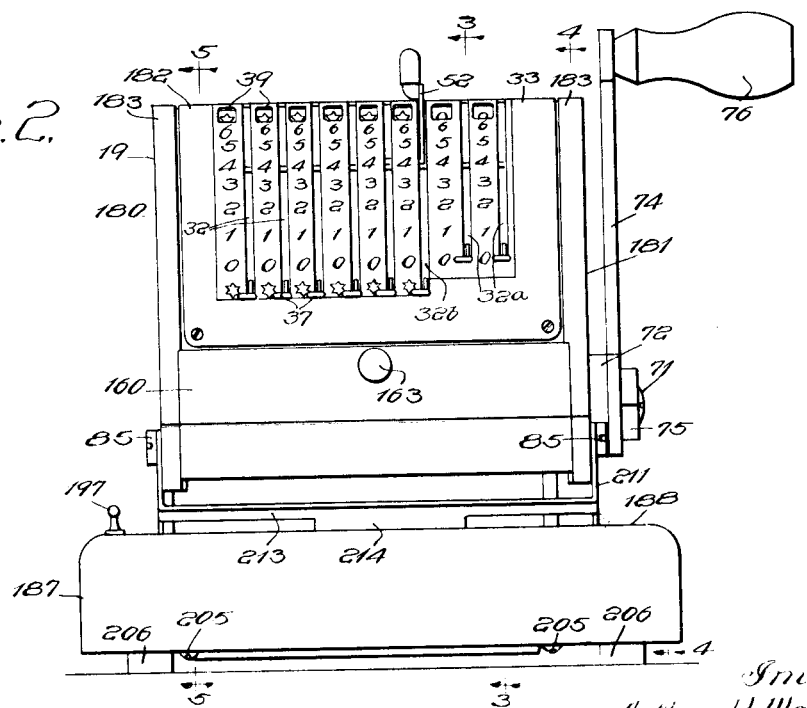

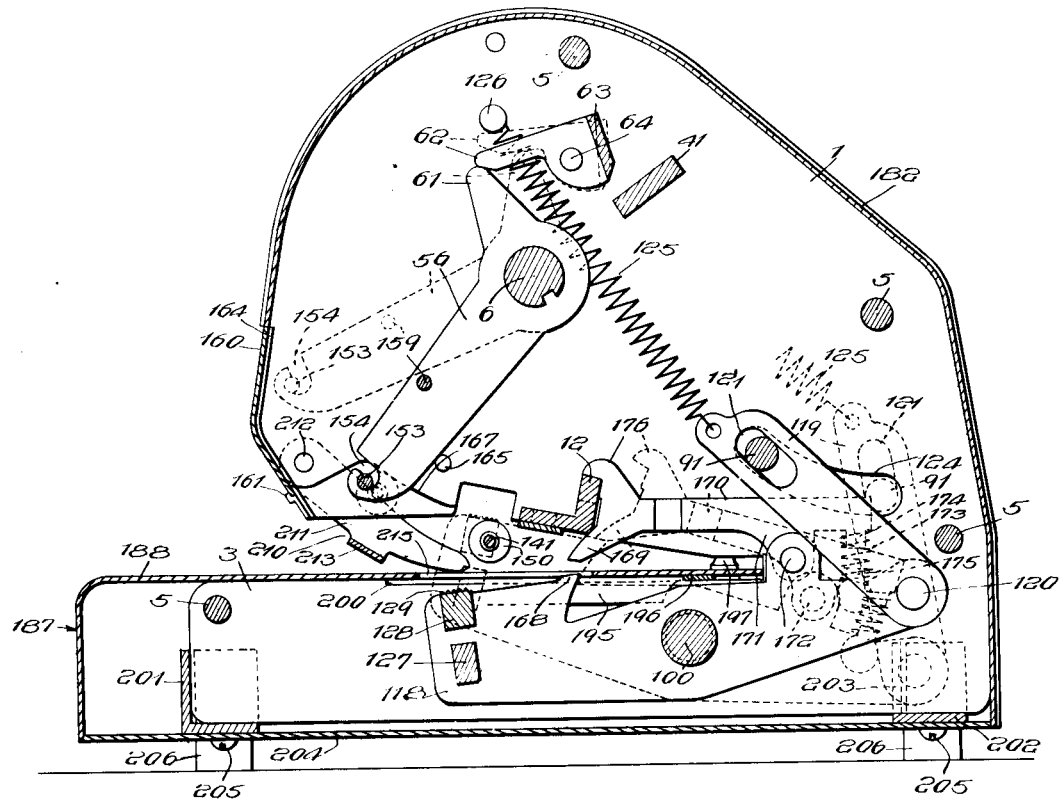
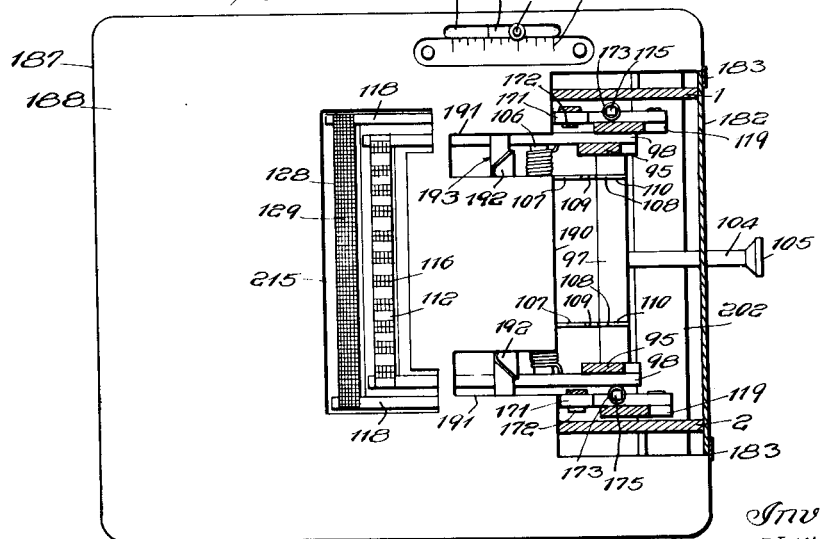

May 16, 1933.  A. H. WOODWARD ET AL  1,909,141

CHECK WRITER

Filed June 24, 1931  7 Sheets-Sheet 5

Witness:
William P. Kilroy

Inventor:
Arthur H Woodward
William E. Richmond
By Brown, Jackson, Boettcher & Dienner,
Attys.

May 16, 1933.  A. H. WOODWARD ET AL  1,909,141
CHECK WRITER
Filed June 24, 1931   7 Sheets-Sheet 6
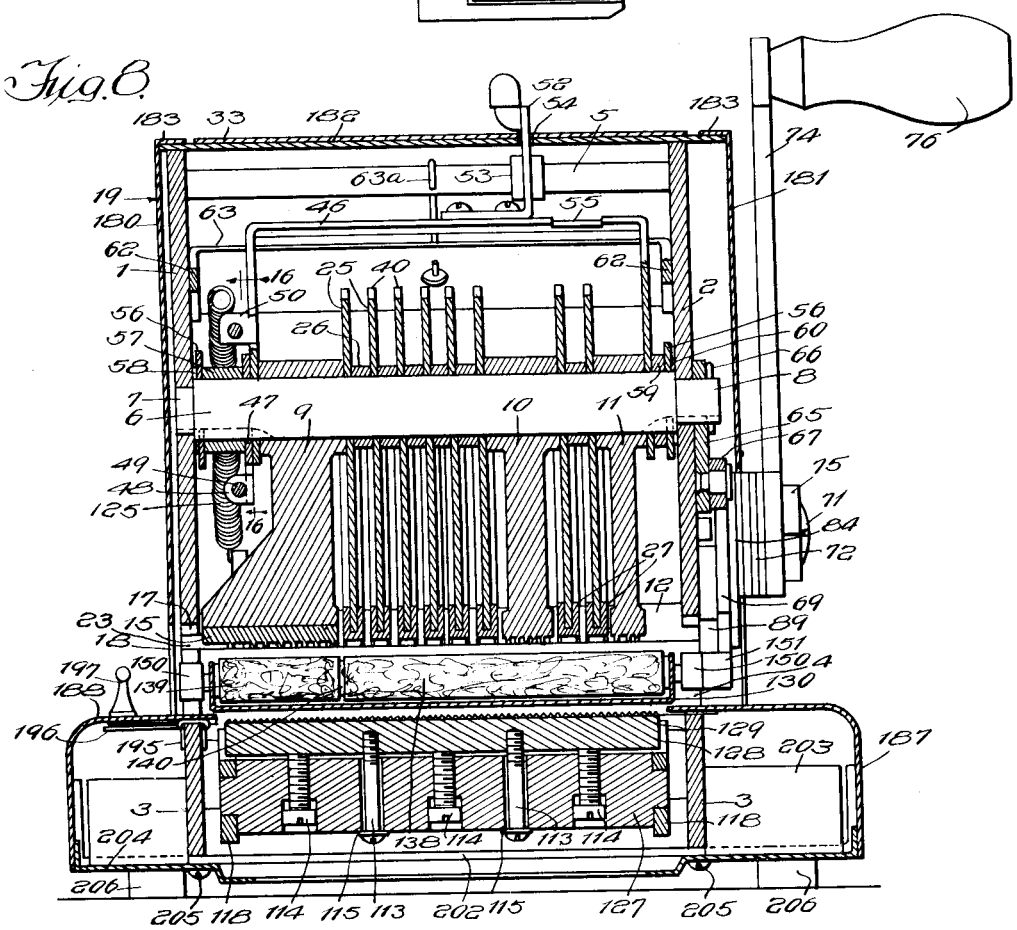
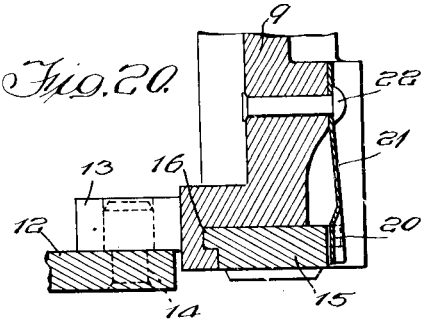
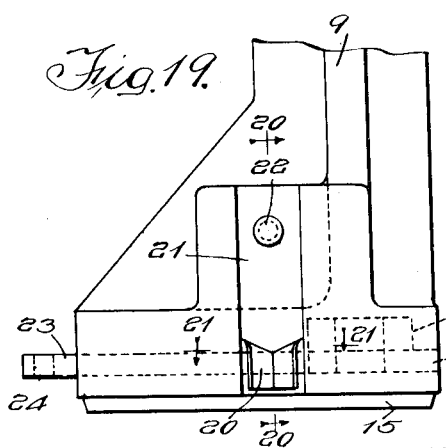
Inventors
Arthur H. Woodward
William E. Richmond

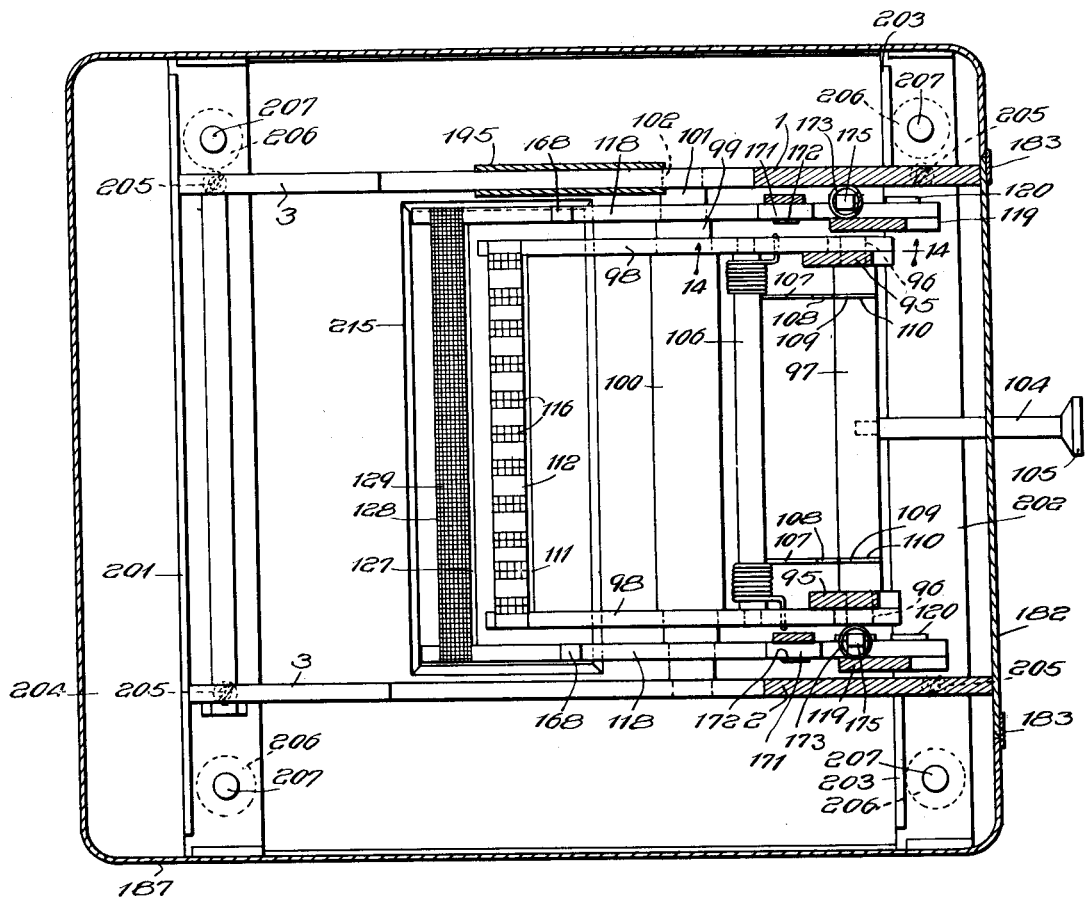
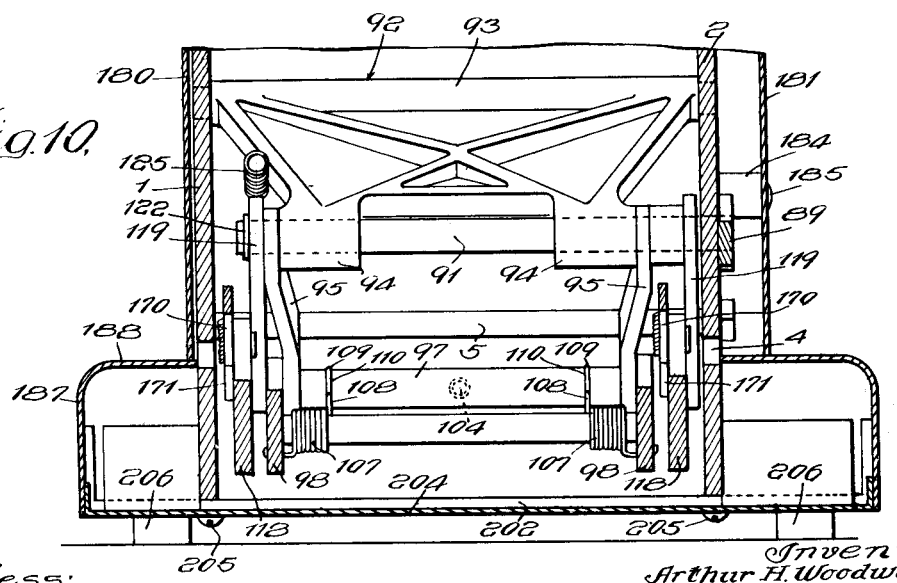

Patented May 16, 1933　　　　　　　　　　　　　　　　　　　　　　1,909,141

UNITED STATES PATENT OFFICE

ARTHUR H. WOODWARD, OF WINNETKA, AND WILLIAM E. RICHMOND, OF WILMETTE, ILLINOIS, ASSIGNORS TO INTERNATIONAL REGISTER COMPANY, OF CHICAGO, ILLINOIS, A CORPORATION OF ILLINOIS

CHECK WRITER

Application filed June 24, 1931. Serial No. 546,452.

This invention relates to machines for writing checks and like instruments, and has to do more particularly with a machine employing independently adjustable printing segments and cooperating platen means for effecting the printing operation.

One of the main objects of our invention is to provide a machine of the character stated of compact and simplified construction and which can be produced at comparatively low cost. Further objects are to provide improved means for inking the printing characters, and to provide means whereby the printing segments are held out of contact with each other while being accurately held in proper alignment during the printing operation. Another object is to provide improved means for operating the machine and for locking the printing segments in proper alignment during the printing operation. It is also an object of our invention to provide a machine in which the inking mechanism can be removed with facility, and in which the type characters and the platen are readily accessible for cleaning. Further objects and advantages of our invention will appear from the detailed description.

In the drawings:

Figure 1 is a side view of a check writer in accordance with our invention;

Figure 2 is a front view of the check writer;

Figure 3 is a section taken substantially on line 3—3 of Figure 2;

Figure 4 is a section taken substantially on line 4—4 of Figure 2;

Figure 5 is a section taken substantially on line 5—5 of Figure 2;

Figure 6 is a section taken substantially on line 6—6 of Figure 1;

Figure 8 is a section taken substantially on line 8—8 of Figure 1;

Figure 9 is a section taken substantially on line 9—9 of Figure 1;

Figure 10 is a section taken substantially on line 10—10 of Figure 3;

Figure 11 is a plan view of the inking roller assembly;

Figure 12 is a section taken substantially on line 12—12 of Figure 11, on an enlarged scale;

Figure 13 is a detail perspective view of the check stop bar;

Figure 14 is a fragmentary sectional view taken substantially on line 14—14 of Figure 9, on an enlarged scale;

Figure 15 is a fragmentary sectional view taken substantially on line 15—15 of Figure 3;

Figure 19 is a detail front view, on an enlarged scale, of the lower portion of the "sum" or name plate type bar and associated parts;

Figure 20 is a section taken substantially on line 20—20 of Figure 19;

Figure 21 is a section taken substantially on line 21—21 of Figure 19;

Figure 22 is a face view of the printing plate for the "sum" or name plate type bar;

Figure 23 is a fragmentary face view of a check printed on a machine embodying our invention.

Figure 7:
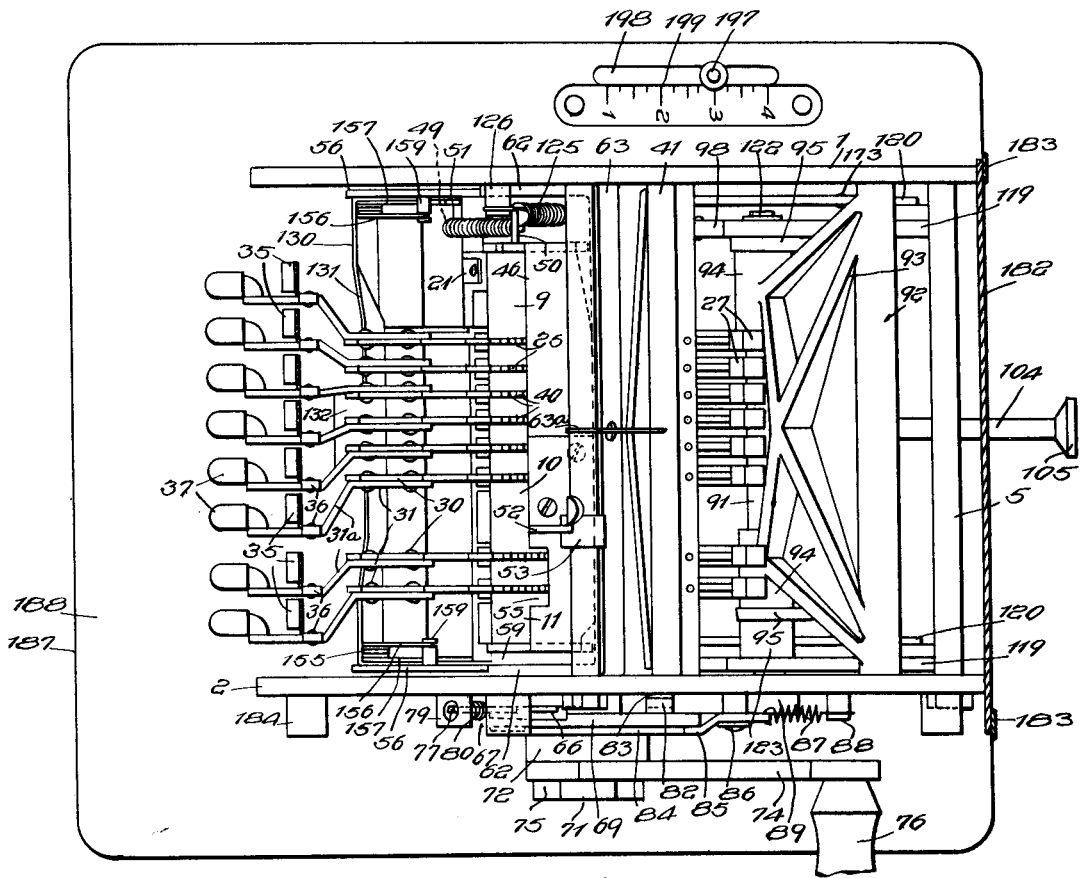
Figure 7 is a plan view of the check writer with the upper portion of the casing removed, the number strips being shown in section.

The main frame of the machine comprises side plates 1 and 2 of irregular polygonal shape, each of these plates being provided with a forwardly extending base element 3 which defines, with the body portion of the plate, a rearwardly extending slot 4 for insertion of the check or like paper into the machine. These plates are secured together, in spaced relation, by spacing rods 5 suitably secured through the plates.

A shaft 6 is rockably mounted in the plates 1 and 2, by means of reduced studs 7 and 8 formed at the ends of the shaft and providing shoulders which abut the inner faces of the plates and hold the shaft against endwise movement. A "sum" bar 9, a "dollars" bar 10 and a "cents" bar 11 are mounted at their upper ends upon the shaft 6, each of these bars being provided with a sleeve which fits snugly about the shaft. Each of these bars is secured at its lower end to a guide bar 12 which extends transversely of the main frame and has its end portions suitably secured in the plates 1 and 2. The manner of securing the bars 9, 10, and 11 to the guide bar 12 is shown more clearly in Figure 20. Bar 9 is provided with a rearwardly extending lug 13 which is suitably bored and snugly receives the head of a headed stud 14 riveted or otherwise suitably secured through the guide bar 12. The lower ends of bars 10 and 11 are similarly secured to bar 12. The bars 9, 10 and 11 are thus effectively secured in position and held in proper relation to the guide bar 12. The printing line of the machine is the line defined by the bars 9, 10 and 11, and the segments which carry the printing characters are individually adjusted to align such characters on this printing line. Bar 10 bears upon its lower or printing face the abbreviation "dol's" for dollars, and the bar 11 bears upon its printing face the characters "cts" constituting the abbreviation for cents. Preferably bar 9 is provided with a plate 15 at the lower end thereof. This plate is slidably mounted in the bar by being provided with lateral shoulders 16 which fit into corresponding grooves in the bar. Referring more particularly to Figure 8, side plate 1 is provided with a suitable opening 17 aligned with an opening 18 in an enclosing casing 19. This provides means whereby the plate 15 may be inserted into and withdrawn from the lower end of bar 9. Plate 15 is held in position by means of a detent 20 of approximately V-shape in horizontal section, this detent being formed integrally with the leaf spring 21 which is suitably secured at its upper end, as by means of a rivet 22, to bar 9. The detent 20 engages into a correspondingly shaped notch in the front edge of plate 15 and serves to hold this plate in position while permitting a limited amount of movement or play thereof in bar 9. The plate 15 may bear a suitable legend upon the printing face thereof, such as "the sum". Preferably, however, this plate bears the name of the drawer of the check or like paper. As will be noted more clearly from Figure 23, the printing characters upon the printing face of plate 15 are serrated so as to perforate the paper of the check. The printing characters cooperate with a platen which is also provided with serrations upon its active face, which serrations cooperate with the serrations of the printing characters to effectively perforate the paper or material of the check.

In this respect, the slight movement or play of the plate 15 is advantageous as permitting of the serrations of the printing characters of the plate being properly aligned with the serrations of the platen by slight movement of the plate as the platen is brought into full operative relation to the printing characters. Conveniently, the plate 15 is provided, at its outer end, with a projection 23 having an opening 24 therein to facilitate withdrawal of the plate by insertion of a suitable instrument through this opening.

A plurality of type segments 25 are mounted upon shaft 6 for turning movement thereon, these segments being spaced apart by spacers 26 mounted upon the shaft. We have shown six segments being held against 9 and 10, these segments being held against movement endwise of the shaft by the spacers 26 and the sleeves at the upper ends of bars 9 and 10. Two printing segments 25 are disposed between the sleeves at the upper ends of bars 10 and 11 and are mounted upon the shaft 6 in the same manner as the segments between bars 9 and 10. An arcuate type bar 27 is suitably secured to the edge portion of each segment for movement therewith. This bar is provided, upon its printing face, with a series of characters ranging from zero to nine and arranged in seriatum order, there being a spacing character, such as an asterisk or star, preceding the zero or naught character. Referring more particularly to Figs. 3 and 15, the guide bar 12 is provided with a plurality of guide slots 28 extending from front to back thereof, this bar being of approximately L-shape in cross section. These guide slots receive the type bars 27 of the respective segments so as to guide the segments in the movement thereof and hold them against lateral movement. In this connection, it will be noted that the forward edge of the guide bar 12 is disposed adjacent the printing line of the machine, determined by the bars 9, 10 and 11. The characters which are used for printing in a given printing operation are those which are disposed in alignment immediately in front of the forward edge of the guide bar. This is advantageous as assuring that the type characters used in the printing operation are effectively held against any objectionable looseness or play during the printing operation, thus assuring accuracy.

Figure 17:
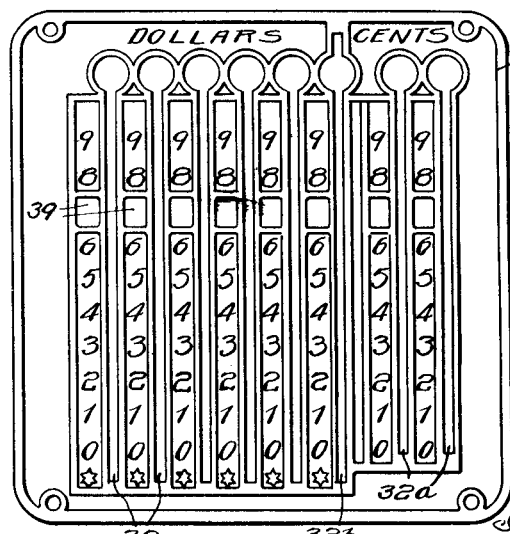
Figure 17 is a detail outer face view of the number or index plate.
Figure 18:
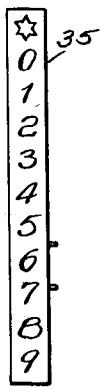
Figure 18 is a detail outer face view of one of the number strips.

Each segment 26 is provided with a forwardly projecting finger 30 to which is riveted or otherwise suitably secured a grip member 31. Each of these members is suitably shaped and disposed to project through a slot 32 in an index plate 33 which is suitably secured over an opening 34 provided in the casing 19. A number strip 35 is suitably secured to member 31, as by means of a tab 36 of channel construction formed integrally with the strip and fitting about element 31a of member 31, which element is reduced in width and projects through slot 32, the channel element 36 being riveted to element 31a. At its outer end, element 31a is provided with a suitable finger grip 37. The strip 35 is disposed concentrically with the shaft 6, as is plate 33, and is marked correspondingly to the arrangement of the characters upon the type bar 27. As will be noted more clearly from Figure 17, plate 33 is provided, adjacent each slot 32, with a series of characters corresponding to the characters of the type bar 27, but arranged oppositely thereto. This plate is further provided, adjacent each slot, with an opening 39 for observation of the strip 35 which is disposed to move beneath such opening. The number strips 35 are so disposed that the number or character visible through the window 39 corresponds to the character of the associated type bar which is disposed upon the printing line of the machine. Also, the element 31a of grip member 31 is so disposed as to be aligned with that character of the series of characters adjacent slot 32 of plate 33 which corresponds to the character of the type bar which is in position upon the printing line. This provides simple and efficient means for accurately determining the set of the respective printing or type segments.

The printing segments 25, being loose upon the shaft 6, are independently adjustable on a common axis for selectively aligning the printing characters of the type bars 27 on the printing line of the machine, this independent adjustment of the segments being accomplished by direct movement thereof through the manual operation of member 31. Each segment 25 is provided with a two-way rack 40 formed by cutting teeth in the hub portion of the segment. An index bar 41 is suitably secured at its ends in the plates 1 and 2, this bar being disposed in rear of and above the shaft 6. Bar 41 is suitably bored from its lower and forward edge for reception of expansion coil springs 42, one of which is shown in Figure 3. This spring is confined between a detent ball 43, at its lower end, and a shoulder provided at the upper end of the bore which receives the spring. The bar 41 is slotted at 44 for reception of rack 40, and the ball detent 43 engages between the teeth of the rack and provides, therewith, means for yieldingly holding the segment 25 in adjustment. The shoulder at the rearward end of the rack 40 is disposed to contact bar 41 so as to limit turning of segment 25 in a counterclockwise direction, as considered in Figure 3. When the finger grip 37 is in its lowermost position, the associated segment is in such position that the first character or asterisk thereof is disposed on the printing line of the machine. This is true of the segments disposed between the bars 9 and 10, which may be referred to as the dollar segments, but the segments between the bars 10 and 11, which may be referred to as the cents segments, are incapable of being turned into position to bring the asterisk thereof in position on the printing line, since the two slots 32a of the plate 33, at the right hand side thereof, are somewhat shorter than the slot 32. The length of the slots 32a is such that the zero or naught characters of the cents segments are disposed on the printing line when the finger grips 37 of such segments have been moved into their lowermost position. This is advantageous since, when the finger grips of all of the segments are in their lowermost position, which is the normal position thereof, the two finger grips of the cents segments are disposed slightly above the finger grips of the dollar segments so as to be distinguished therefrom and reduce liability of confusion between the segments in setting the machine for printing.

Figure 16:
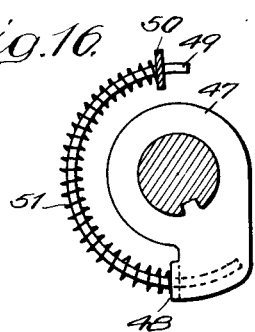
Figure 16 is a section taken substantially on line 16—16 of Figure 8.

After a printing operation, all of the segments should be returned to normal position. For this purpose, I provide a clearing yoke 46 of inverted U-shape, the arms of which are loosely mounted upon shaft 6. The inner faces of the arms of the yoke abut the outer end of the sleeve at the upper end of bar 9 and the outer end of the sleeve at the upper end of bar 11, respectively. An arm 47 is keyed on shaft 6 at the outer side of the left hand arm of yoke 46 as considered in Figure 8. This arm 47 is provided, at the lower end thereof, with a laterally extending tab 48 through which extends a rod 49 the lower end of which is suitably secured, as by spot welding, to arm 47. Referring more particularly to Figure 16, the rod 49 is disposed concentrically with shaft 6 and the upper portion of this rod is slidable through a tab 50 projecting laterally from the adjacent arm of yoke 46. An expansion coil spring 51 is mounted about rod 49 and confined between tabs 48 and 50. This spring provides yielding means for normally holding the yoke in its raised or inoperative position. Rearward movement of the yoke is limited by contact of a grip member 52, suitably secured to the bight portion of the yoke, with a rubber bumper 53 disposed upon the uppermost spacer rod 5. The grip member 52 extends through a slot 54 in the casing 19, at the top thereof, and is operative in this slot and in a registering slot 32b in the number or index plate 33. As will be noted more clearly from Figures 7 and 8, yoke 46 is provided with a notch 55 in the bight portion thereof disposed for reception of the two grip members of the "cents" segment. By swinging the yoke forwardly and downwardly, after a printing operation, all of the segments are returned to normal or inoperative position. The provision of the rod 49 concentric with shaft 6, and associated parts for normally holding the yoke in raised position, is advantageous as providing a simple and compact arrangement which occupies much less space than would be necessary if the spring 51 were otherwise arranged. Movement of segments 25 in a clockwise direction, as viewed in Fig. 3, is limited by contact of the fingers 30 and grip members 31 thereof with yoke 46.

Two inking arms 56 are keyed upon the shaft 6 for movement therewith. One of these arms is disposed between a spacer 57 mounted about shaft 6 between arm 47 and arm 56, and a washer 58 disposed between arm 56 and the inner face of side plate 1. The other arm 56 is mounted between a spacer 59 mounted upon the shaft between the adjacent arm of yoke 46 and arm 56, and a washer 60 disposed between arm 56 and the inner face of plate 2. The inking arms 56 are thus connected to shaft 6 for rocking movement therewith. Referring more particularly to Figures 3 and 5, each of the inking arms 65 is provided with an upwardly extending cam finger 61 disposed to contact a finger 62 extending forwardy from a locking and aligning bar 63 which is pivotally mounted at each end, at 64, between the plates 1 and 2. This bar is disposed above the type segments and so arranged that, when it is moved into the dotted line position of Figure 5, its lower edge contacts the teeth of the racks 40 of the segments so as to align any of the characters thereof which may be out of alignment on the printing line, and then lock the segments against turning movement about shaft 6. This occurs when the shaft 6 is rocked in a clockwise direction, as considered in Figure 5, so as to bring the inking arms 56 into the dotted line position of this figure. Adjusting and then locking the type segments against turning movement in this manner is advantageous as assuring accuracy in the printing operation. The bar 63 is normally held in raised position by a bowed wire spring 63a, one end of which is engaged over the adjacent spacer rod 5, the other end of this spring being suitably attached to the bar.

As is shown more clearly in Figures 4 and 8, a cam lever 65 is keyed upon the stud 8 of shaft 6, this lever being confined between the outer face of side plate 2 and a cotter pin 66 secured through stud 8. A roller 67 is suitably mounted upon lever 65 adjacent the lower end thereof. A stud shaft 68 is suitably secured through plate 2 and projects beyond the outer face thereof. A cam 69 turns about this shaft and is mounted thereon by means of a bushing 70 secured through the cam and mounted upon the stud shaft 68. A screw 71 threads into the outer end of the stud shaft and the head of this screw contacts the outer end of bushing 70 which is thus held against endwise movement. The cam includes a hub 72 concentric with bushing 70 and provided with two pins 73 suitably secured therein. An operating lever 74 fits about the outer portion of the bushing 70 and seats against the outer face of hub 72, this lever being provided with openings which snugly receive the pins 73. A nut 75 screws upon the bushing and bears against the outer face of lever 74, at the lower end thereof, thus retaining the lever in operative relation to hub 72 of the cam. The lever 74 is provided, at its upper end, with a suitable handle 76 for convenience in operation. Normally the cam 69 is in the position illustrated in Figure 4. A rod 77 is pivotally connected at its lower end, at 78, to cam lever 65. The upper end portion of this rod is slidable through a stud 79 secured to plate 2 at the outer face thereof. An expansion coil spring 80 is mounted about this rod and confined between head 81 at the lower end thereof and stud 79. The connection 78 is in advance of shaft 6 so that the spring 80 tends to turn the arm 65 in a counterclockwise direction, as considered in Figure 4, and urges the roller 67 toward the cam. Upon turning movement of cam 69 in a clockwise direction, as considered in Figure 4, arm 65 is also rocked in a clockwise direction thus swinging the shaft 6 so as to raise the inking arms into the dotted line position of Figure 5 and move the locking bar 63 into position to lock the segments against movement. Upon return of the cam 69 to normal position, the shaft 6 is rocked in a counterclockwise direction so as to return the inking arms to the full line position of Figure 5.

Turning movement of cam 69 in either direction is positively limited by a pin 82 projecting from the inner face of the cam and disposed to contact stop pins 83 secured to plate 2 and projecting beyond the outer face thereof at opposite sides of stud shaft 68. We also provide full throw means for assuring that the cam 69 will be turned through the full distance in either direction once operation of this cam has been started. For this purpose the cam is provided with a rack segment 84 conveniently formed integrally therewith, though this segment may be otherwise formed. A full throw pawl 85 is pivoted at 86 and a tension spring 87 has one end attached to the pawl in rear of the pivot 86 thereof, the other end of this spring being attached to a stud 88 projecting from plate 2. The point of attachment of spring 87 to the pawl is on dead center with the pivot of the pawl and with pin 88. When the cam 69 is turned in either direction a sufficient distance to cause engagement of the rack 84 with pawl 85, the pawl prevents reverse turning movement of the cam until the latter has been turned a sufficient distance to move the rack 84 beyond the pawl.

An operating link 89 is pivoted at its forward end, at 90, to cam 69 at the lower forward portion of the inner side thereof. At its rearward end this link 89 is pivoted to pintle 91 of a toggle link structure 92 shown more clearly in Figures 3, 9 and 10. This toggle link structure includes an upper member 93 which is pivotally mounted, at its upper edge, in plates 1 and 2. Member 93 is provided, at the lower edge and adjacent each end thereof, with spaced sleeves 94 through which the pintle 91 passes. Links 95 are loosely mounted at their upper ends upon pintle 91 adjacent the outer ends of the sleeves 94. At their lower ends these links receive reduced studs 96 formed at the ends of a spacing rod 97. The studs 96 pass through perforator supporting arms 98 which are rockably mounted intermediate their ends upon reduced elements 99 of a shaft 100. Each end portion of this shaft is of stepped formation, and includes three successively reduced elements 99, 101 and 102, the elements 102 being mounted through plates 1 and 2 and supporting the shaft 100 for rocking movement. As will be noted more clearly from Figure 14, each of the arms 98 is provided, adjacent the rear end thereof, with an arcuate slot 103 which is curved forwardly and downwardly of arm 98. The studs 96 pass through slots 103 and the rod 97 is capable of limited forward and rearward movement for adjusting the position of the studs in the slot.

A pull rod 104 is suitably secured to the spacer rod 97, intermediate the ends thereof, and projects rearwardly through a suitable opening provided in the rear wall of casing 19, this rod being provided at its outer end with a knob 105. A second spacer rod 106 is mounted in the arms 98 adjacent and in rear of shaft 100. Wire springs 107 are mounted about rod 106 one arm of the respective springs engaging beneath the adjacent arm 98. The springs 107 extend rearwardly over rod 97 and each spring is provided with two contiguous elements 108 and 109 suitably shaped to engage about the upper portion of rod 97 within grooves 110 extending about the rod circumferentially thereof. When the spacer rod 97 is in the position illustrated in Figure 9, studs 96 are disposed at the upper and rearward ends of the slots 103 and elements 108 engage about the rod for yieldingly holding it in this position. Under such conditions, when the toggle lever structure is straightened or extended maximum downward movement of the rearward ends of arms 98 will occur, with maximum upward movement of the forward ends of such arms. By moving the rod 97 into its forward position, the studs 96 are caused to pass into the forward lower portions of slots 103 thus raising the rearward ends of arms 98 and lowering the forward ends of such arms. Elements 109 of springs 107 engage about the upper portion of rod 97 and hold it in this forward position. Moving rod 97 into its forward position shifts the point of connection between links 95 and arms 98, and raises the rearward ends of these arms to such an extent that when the toggle lever structure is straightened the forward ends of arms 98 will not be raised sufficiently to render active the perforating means carried thereby. This provides simple and efficient means for disabling and enabling the perforating means for perforating the drawee's name on a check or like instrument.

Referring more particularly to Figures 3 and 9, a supporting bar 111 is suitably supported between the arms 98 at the forward ends thereof. A perforating bar 112 is adjustably mounted upon the upper face of bar 111 by means of screws 113 and 114. The screws 113 screw into bar 112 and the heads of these screws contact washers 115 bearing against the under face of bar 111. The heads of screws 114 are countersunk in bar 111 from the under face thereof, these screws threading through the upper portion of bar 111 and bearing against the under face of bar 112. The screws 113 and 114 cooperate for securing the perforator bar 112 to the supporting bar 111 and for adjusting the perforator bar toward and away from the supporting bar. The upper face of bar 112 is serrated at 116 to provide points or tooth elements which, when bar 112 is raised into its full operative position, pass through perforations in a perforator plate 117 suitably secured upon the under face of guide bar 12. The bar 112 and the plate 117 thus cooperate to perforate the area of the check corresponding to the drawee's name and, as above noted, by shifting the spacer rod 97 such perforating means can be rendered either operative or inoperative, as desired. The perforations in plate 117 are shown in Figure 15. The ends of the perforator bar 112 set snugly into guide slots extending from the upper edges of the arms 98, such slots providing means for guiding the bar during adjustment thereof and for holding it against lateral movement.

Platen supporting arms 118 are rockably mounted upon the elements 101 of shaft 100. These arms are connected, at their rearward ends, by links 119 to pintle 91, the lower ends of these links being pivoted at 120 to arms 118. Each of the links 119 is provided, adjacent its upper end, with a slot 121 (Figure 5) which extends lengthwise of the link and receives the pintle 91. In the normal position of the parts, the pintle is disposed an appreciable distance above the lower ends of the slots, thus providing a lost motion connection between the links and the pintle. This pintle is provided, at the end thereof adjacent side plate 1, with a circumferential groove which receives a lock washer 122 (Figure 7) of known type, the upper end of link 119 adjacent plate 1 being confined between this washer and the upper end of the adjacent link 95. A spacer 123 is mounted upon the pintle between the upper end of the other link 95 and the upper end of the link 119 adjacent side plate 2. Pintle 91 projects through an arcuate slot 124 (Figure 4) through plate 2 and is pivotally connected to the rearward end of link 89 as previously described. A tension spring 125 (Figure 5) is anchored at its upper end to a stud 126 secured to side plate 1 at the inner face thereof, the lower end of this spring being suitably secured to the upper end of link 119 adjacent this plate. This spring provides yielding means for normally holding the toggle lever structure in folded or retracted position thus normally holding the rearward ends of the arms 98 and 118 in raised position and the forward ends of these arms in lowered or inoperative position.

A platen supporting bar 127 is suitably secured in the forward ends of arms 118 slightly in advance of bar 111. A platen 128 is adjustably mounted in this bar and in the arms 118 in the same manner as the perforator bar 112 is mounted. The upper face of the platen is serrated and cooperates with the printing characters of the segments and the bars 9, 10 and 11 disposed upon the printing line of the machine, which characters are also serrated as above noted.

As will be noted more clearly from Figure 3, with the parts in their normal or inoperative positions, the platen and the perforator bar are disposed below and an appreciable distance from the printing characters aligned on the printing line of the machine, and the perforator plate, respectively. This provides ample room for operation of an inking assembly between the printing characters and the platen and perforator plate. The inking assembly includes a tray 130 conveniently formed of sheet metal and preferably provided, at its forward portion, with an inwardly offset wall 131 and a gripping element 132 formed integrally therewith for convenience in removing and replacing the assembly. An inking roller 133 is rotatably mounted in the tray 130 at the rear thereof. This roller contacts a transfer roller 134 which contacts a fountain or supply roller 135. The rollers are of similar construction and each includes a shaft 136 provided with a felt covering, conveniently formed of a plurality of felt disks 137 which fit tightly upon the shaft in endwise contact so as to be frictionally secured thereon. Preferably each shaft is provided with two series of disks forming two sections 138 and 139, the latter being relatively short, separated by a spacer 140. In practice these sections are saturated with differently colored inks, section 138 being saturated with red ink and section 139 being saturated with blue ink. Roller 133 is provided with pins 141 suitably secured to the ends of shaft 136 and projecting through the end walls of tray 130. The shaft of roller 134 is provided with end pins 142 which project through slots 143 in the end walls of the tray and disposed fore and aft thereof. The shaft of roller 135 is also provided with pins 144 which extend through slots 145 in the end walls of the tray, these slots being inclined downwardly and rearwardly of the tray. A ratchet wheel 146 is suitably secured upon one of the pins 144 of roller 135 and is engaged by a spring pressed pawl 147 pivoted at 148 upon the adjacent end wall of the tray. The pawl and the ratchet are so related as to permit of rotation of roller 135 in a clockwise direction as considered in Figure 12, while preventing reverse rotation of this roller. This permits of rotation of roller 134 in a counterclockwise direction for supplying ink to the roller 133 upon rotation of the latter in a clockwise direction. The advantage of this is that ink is transferred from roller 134 to roller 133 during rotation of the latter in a clockwise direction so that ink squeezed from roller 134 is transferred to and moved upwardly by roller 133 and has an opportunity to soak into the felt of roller 133 thus avoiding dripping of ink into the tray with the possibility of the mingling together of the two differently colored inks in the lower forward portion of the tray in sufficient quantity to contact with the roller 133 and cause mixing of the differently colored inks on the sections of this roller. The pawl 147 is urged towards ratchet wheel 146 by a wire spring 149. This spring exerts a downward pressure upon roller 135, through the pawl 147 and serves to hold the rollers in contact. Upon rotation of the roller 133 in a counterclockwise direction, as considered in Figure 12, roller 134 is held against rotation due to its contact with roller 135. In this connection, the slots 143 permit of slight forward and readward movement of roller 134 so that this roller is caused to rotate by roller 133, when the latter is turned in a clockwise direction but is held against rotation when roller 133 is turned in a counterclockwise direction.

Pins 141 project beyond the end walls of tray 130 and each of these pins is provided with a collar 150 of a suitable friction material, such as rubber. One of the pins 141 is elongated and has secured on the outer end thereof a metal collar 151 forming a cam bearing member. A headed pin 152 is suitably secured through each end wall of the tray, adjacent the upper forward corner thereof. This pin is provided with a reduced extension 153 which projects outwardly beyond the end wall of the tray for insertion into a hook shaped slot 154 extending from the upper edge of each of the inking arms 56 adjacent the forward end thereof. This provides convenient means for pivotally and removably mounting the inking assembly upon the forward ends of the arms 56, as in Figures 3, 4 and 5. A wire spring 155 is coiled about each of the pins 152 and has its end portions extended to form arms 156 and 157. Arms 157 engage beneath tabs 158 struck from the end walls of tray 130. Arms 156 extend in front of and contact with headed studs 159 carried by the inking arms 56, when the inking assembly is mounted in operative position upon such arms. The springs 155 yieldingly urge the inking assembly upwardly and inwardly about the axis of pins 152 toward the shaft 6. This inking assembly can be removed from the arms 56 with facility by grasping the gripping element 132 and moving the assembly inwardly a short distance and then upwardly so as to disengage the pins 153 from the slots 154. To permit of removal and replacement of the inking assembly, the casing 19 is provided, at the front portion thereof, with a suitable opening normally closed by a door 160 conveniently formed of sheet metal, the lower corners of which fit into angle members 161 suitably secured to the sides of the casing. This door is releasably secured in position by a latch 162 which is operated by a knob 163 at the outer side of the door. The ends of the door 160 seat in depressions provided in flanges 164 projecting inwardly from the sides of the casing. When latch 162 is in operative position, it contacts the inner face of the edge portion of the casing wall at the upper side or top of the door opening. By turning the latch into inoperative position, the door may be removed with facility. By reference to Figure 3, it will be noted that the disposition of the door opening is such that, upon removal of the door and the inking assembly, ready access is had to the printing characters upon the type segments, as well as to the printing characters upon the bars 9, 10 and 11 and to the platen and the perforator bar and plate for cleaning, adjustment or repairs.

Downward and rearward movement of the inking arms 56, under the influence of spring 80 and associated parts, is positively limited by stop pins 165 secured to the side plates 1 and 2 at the inner faces thereof. These pins are so disposed that, when the main operating lever 74 is in its full inoperative position, collar 151 secured on the end pin of roller 133 is disposed in contact with the tip of a nose element 166 of the main operating cam 69, as in Figure 4. The forward face of this nose element is inclined to provide a cam surface with which collar 151 contacts as the inking assembly is moved into the position of Figure 3, thus swinging the tray 130 and the parts carried thereby in a clockwise direction as considered in Figure 3 and moving the inking roller 133 downwardly away from the printing characters, in which position the inking roller is held by the nose element of the cam. In this manner, the inking roller is normally held out of contact with the printing characters, which is advantageous as preventing clogging of such characters.

As will be noted more clearly from Figure 4, when the operating lever 74 is in its full inoperative position, there is a slight clearance between the forward face of cam 69 and roller 67. This permits of forward movement of the operating lever a short distance without affecting the cam lever 65, this movement being sufficient to move the nose element 166 of cam 69 rearwardly out of contact with member 151 thus releasing the inking assembly and permitting of upward movement of roller 133 into inking contact with the printing characters aligned on the printing line of the machine. In the continued forward movement of the operating lever, the inking arms 56 are swung upwardly and forwardly, in the manner previously described, so as to roll the inking roller 133 across the alined characters in contact therewith and then withdraw the inking assembly from between the printing characters and the platen. The perforating bar and the platen are then moved into operative relation to the perforator plate and the printing characters, in the manner above set forth. It is to be noted that the perforator bar is operated somewhat in advance of the platen, due to the lost motion connections between pintle 91 and links 119, which is advantageous as facilitating operation of the machine.

Each of the side plates 1 and 2 is provided with an edge surface 167 disposed for contact by the friction member 150 secured to the pin 141 of the shaft of inking roller 133, during upward and forward movement of the inking assembly. This causes rotation of roller 133 in a clockwise direction and serves to replenish the ink upon this roller, from the supply roller 135, through the transfer roller 134 in the manner previously described. Upon return movement of the operating lever in a rearward direction, the inking arms 56 are moved downwardly and rearwardly and the inking roller 133 is rotated but, as previously described, the rollers 134 and 135 are not rotated. When the friction members 150 pass off of the track or edge portions 167 of the side plates, the inking roller is moved by the springs 155 upwardly into inking contact with the aligned printing characters. Immediately thereafter nose element 166 of cam 69 contacts member 151 and swings the inking assembly downwardly thus moving the inking roller out of contact with the aligned characters in the manner previously described. In this manner, we assure proper inking of the characters aligned on the printing line of the machine, while avoiding clogging of such characters and also avoiding inking of any other printing characters than those which are disposed on the printing line.

Each of the arms 118 is provided with a check gripping element 168 at its upper edge and in rear of the platen. This element cooperates with a finger 169 extending downwardly from the forward end of a gripping arm 170. This arm is pivoted, a short distance in advance of its rearward end and at 171, upon a lug 172 extending upwardly from arm 118. An expansion coil spring 173 is mounted at its ends about studs 174 and 175 extending from arms 170 and 118, respectively. This spring urges the forward end of arm 170 downwardly for bringing finger 169 thereof into cooperating relation to the gripping element 168. Arm 170 is further provided, at the forward end thereof, with a stop element 176 above finger 169 and disposed to contact guide bar 12 for limiting downward movement of arm 170. When the arms 118 are swung upwardly into the operative position indicated by dotted lines in Figure 5, elements 68 and finger 69 cooperate to securely grip a check inserted therebetween thus assuring that the check is properly held during the printing operation. Upon return of the arms 118 to lowered position, stop elements 176 contact the guide bar 12 thus limiting downward movement of arms 170 and, during the continued downward movement of arms 118 gripping elements 168 are moved away from fingers 169 thus releasing the check.

The casing 19 includes side sections 180 and 181 conforming in outline to the side plates 1 and 2, respectively, a central section 182 which extends over the back and top and front portions of the machine, and a bottom section 187. As is shown more clearly in Figure 8, each of the side sections is provided with an inwardly projecting flange 183 and these flanges extend over the lateral edge portions of central section 182 which is thereby confined against outward movement and effectively held about the plates 1 and 2. Side section 181 of the casing is spaced from plate 2 by means of spacing studs 184 (Figure 4) suitably secured to this plate at the outer face thereof. Section 181 is secured to these studs in a suitable manner, as by means of screws 185 (Figure 1) and is provided with a suitable opening to accommodate the hub 72 of the main operating cam 69. Side section 180 of the casing is secured directly to plate 1 in a suitable manner, as by means of screws similar to the screws 185.

The lower or base section 187 of the casing is of boxlike formation and fits over the base extensions 3 of the side plates 1 and 2. The back wall of section 187 is cut away to accommodate the lower portion of section 182 of the casing, and the top wall 188 is cut away from the rearward edge thereof to accommodate the plates 1 and 2 at the juncture thereof with the base extensions 3. The recess thus provided in the top plate is shown at 190 in Figure 6. Top plate 188 is also provided with cut-outs 191 extending forwardly from recess 190, these extensions accommodating stop elements 192 of a check stop 193. This stop is in the form of a bar 194 provided with an integral forwardly extending channel element 195 which fits snugly over the upper portion of one of the base extensions 3 and provides therewith friction means for guiding the bar 194 and for holding it in adjustment. This bar is further provided with an extension 196 projecting laterally from the rearward end of channel member 195. A small knob 197 is suitably secured to the extension 196 and operates through a slot 198 in the top plate and extending fore and aft thereof. A suitable scale 199 is provided adjacent slot 198 for indicating the set of the check stop. The stop elements 192 are curved upwardly and forwardly and project above the top wall 188 for contact with the inner edge of a check for limiting insertion thereof into the machine. This stop is readily adjusted by means of the knob 197 to accommodate checks of different widths. As will be noted more clearly from Figure 5, the base extension 3 of side plate 1 is provided, in its upper edge, with a recess 200 which receives the bight portion of the channel member 195 and limits travel of the check stop in either direction.

A brace member 201 of substantially L-shape in cross section is secured across the base or lower casing section 187 adjacent the front thereof. This brace member fits about and beneath the forward ends of base extensions 3 of plates 1 and 2, as in Figure 5, and serves, in conjunction with top wall 188 of casing section 187, to hold the latter in position upon extensions 3, while also limiting rearward movement of casing section 187 relative to the extensions 3. A brace member 202 extends across casing section 187 adjacent the rear thereof and beneath the base extensions 3. This brace member 202 is provided with a vertically disposed flange 203 at each end, these flanges extending between the side walls of casing section 187 and the side plates 1 and 2. A rectangular bottom plate 204 fits snugly within the bottom of casing section 187. This plate is secured in position by screws 205 which pass through the plate and through the brace members 202, these screws threading into the base extensions 3. In this manner the lower casing section is effectively secured to the main frame of the machine. Preferably, supporting members or feet 206 are suitably secured through the bottom plate 204. Each of these feet is provided with a reduced stud 207 which fits tightly through aligned openings through the bottom plate and the brace members. The feet 206 are preferably formed of rubber or other suitable cushioning material. By removing the bottom plate 204, and slightly raising the casing section 187, this section may be slid forwardly from off of the base extensions 3. As will be noted more clearly from Figure 1, and as previously stated, the side sections of the casing conform to the side plates 1 and 2 and define, in conjunction with the base extensions 3 and the top plates of the lower casing section 187, a rearwardly converging opening or slot 210 for insertion into the machine of a check. In order that the check may be positioned accurately with respect to the printing line of the machine, we provide a printing line indicator. This indicator includes two arms 211 pivotally mounted at their upper ends, as at 212, upon the sides of the casing and adjacent the front thereof. Conveniently, these arms are pivotally supported by two of the screws utilized for securing the side sections of the casing to the side plates of the main frame. Arms 211 are connected by a cross strip 213 and are so disposed that the check is properly positioned in the opening 210 when the lower forward ends of arms 211 coincide with the line of the check upon which it is desired to print. Referring more particularly to Figure 3, the central portion of strip 213 is extended rearwardly and is curved upwardly slightly to provide a guard element 214. When the check is inserted into the machine, the guard element 214 rests upon the face of the check forwardly of the printing line thereof. Upon forward and downward movement of the operating lever, the inking assembly is swung upwardly and forwardly in the manner previously described, after which the platen and the perforator bar are raised into operative position, the check being securely gripped between elements 168 and fingers 169 in the manner previously described. During the upward movement of the check, the line indicator as a whole swings upwardly, the guard resting upon the face of the check so as to prevent contact of the check with any of the printing characters other than the characters which are properly aligned on the printing line of the machine. This is advantageous as preventing smudging of the check. The type characters and the platen cooperate to print upon the proper portion of the check, beneath the drawee's name, the amount for which the check is drawn, and to perforate the characters thus printed, as indicated in Figure 23. Also, the perforating bar and the perforator plate cooperate to perforate the drawee's name, as indicated in Figure 23, assuming that the perforating bar 12 is rendered operative. If the perforating bar has been disabled, in the manner previously described, the drawee's name will not be perforated.

Top wall 188 of the lower casing section 187 is provided with a suitable opening 215 which accommodates the platen 128 and the perforating bar 112 in the operation thereof. The bottom plate 204 is also provided with an opening 216 which gives access to the screws for securing and adjusting the platen and the perforating bar.

What we claim is:

1. In a machine of the character described, printing means for operating upon a check and including a movable platen, perforating means including a movable perforating member adjacent the platen, an operating lever, and operating connections between the lever and the platen and the perforating member, said connections including a lost motion connection between the lever and the platen acting to assure that the perforating member is operated in advance of the platen for perforating the check and holding it during the printing operation, in the operation of said lever.

2. In a machine of the character described, selectively alineable printing characters, a platen, a double toggle mechanism for operating the platen so as to print from the characters, and a perforator operated separately from and in advance of the platen by said mechanism, the maximum pressure of the two operations being differently timed.

3. In a machine of the character described, selectively alineable printing characters, a platen, a perforator, and a toggle mechanism for operating both the platen and the perforator, said mechanism including a first link common to both the platen and the perforator and duplicate second links so related as to be brought to the point of maximum pressure sequentially in the extension of the toggle mechanism.

4. In a machine of the character described, selectively alineable printing characters, a platen movable toward and away from the alined characters, a perforating member adjacent the platen, a toggle mechanism, operating connections between said mechanism and the perforating member adjustable for optionally disabling and enabling the perforating member, an operating lever, an operating connection between the operating lever and the hinge of the toggle mechanism for extending the latter upon movement of said operating lever in operating direction, and lost motion operating connections between said mechanism and the platen for operating said platen subsequently to the perforating member.

5. In a machine of the character described, a frame, a rock shaft mounted in the frame, type segments loose on the shaft and independently adjustable thereabout for selectively aligning the characters of the segments on a printing line of the machine, a platen movable toward and away from the aligned characters, supporting arms secured to the shaft for movement therewith, an inking roller carried by the arms and disposed to operate between the platen and the alined characters in inking contact with the latter when said arms are moved away from the platen, means yieldingly urging the shaft in a direction to move the arms toward the platen, an operating lever, operating connections between the lever and the platen, means actuated by movement of the lever in operating direction for turning the shaft in a direction to move the arms away from the platen, means including a locking bar for aligning the segments and locking them against relative movement, said bar being yieldingly held in inoperative position, and means actuated by the inking roller supporting arms in the movement thereof away from the platen for moving said bar into operative position.

6. In a machine of the character described, a frame, a rock shaft mounted in the frame, type segments loose on the shaft and independently adjustable thereabout for selectively aligning the characters of the segments on a printing line of the machine, a platen movable toward and away from the aligned characters, supporting arms secured to the shaft for movement therewith, an inking roller carried by the arms and disposed to operate between the platen and the alined characters in inking contact with the latter when said arms are moved away from the platen, means yieldingly urging the shaft in a direction to move the arms toward the platen, an operating lever, operating connections between the lever and the platen, means actuated by movement of the lever in operating direction for turning the shaft in a direction to move the arms away from the platen, and a clearing yoke rockably mounted upon the shaft for returning the segments to normal position.

7. In a machine of the character described, printing means including a plurality of type members independently adjustable for selectively alining the characters thereof on a printing line of the machine, a platen movable toward and away from the alined characters, an operating lever having operating connection with the platen, inking means including a plurality of contacting rollers one of which is an inking roller, means actuated by the lever when moved in operating direction, for moving the inking roller into inking contact with and across said alined characters and then out of the path of movement of the platen and out of contact with the alined characters and for returning the inking roller to a position adjacent the alined characters when the lever is moved in the other direction, and means for rotating said inking roller and thereby rotating the other of the rollers of the inking means during movement of the inking roller out of the path of movement of the platen.

8. In a machine of the character described, printing means including a plurality of type members independently adjustable for selectively alining the characters thereof on a printing line of the machine, a platen, the platen and the alined characters having relative movement toward and away from each other, an operating lever, inking means including a plurality of contacting rollers one of which is an inking roller, said means being movable toward and away from the platen and operable between the same and the alined characters, means actuated by the lever movement thereof in operating direction for moving the inking means away from the platen and from between the latter and said alined characters, means supplemental to the lever actuated means for moving the inking means into operative position upon return movement of the lever, and means for rotating the inking roller and thereby rotating the other of said rollers during movement of the inking means away from the platen.

9. In a machine of the character described, printing means including printing characters selectively alinable on a printing line of the machine, a platen cooperating with the alined characters, inking means including a plurality of contacting rollers one of which is an inking roller, means for moving the inking means into inoperative position and for rotating the inking roller upon relative movement of the platen and the alined characters toward each other, and means for moving the inking means into operative position upon reverse relative movement between the platen and said alined characters.

10. In a machine of the character described, printing means including printing characters selectively alinable on a printing line of the machine, a platen cooperating with the alined characters, inking means including a plurality of contacting rollers one of which is an inking roller, means preventing rotation of the other rollers when the inking roller is rotated in one direction while permitting rotation of said other rollers when the inking roller is rotated in the other direction, means for moving the inking means into inoperative position and for rotating the inking roller in said other direction upon relative movement of the platen and the alined characters toward each other, and means for moving the inking means into operative position upon reverse relative movement between the platen and said alined characters.

11. In a machine of the character described, a plurality of type segments individually adjustable for selectively aligning the characters thereof on a printing line of the machine, a platen cooperating with the aligned characters, inking means yieldingly urged toward the type segments, means for moving the inking means into and out of operative position in accordance with relative movement of the platen and said aligned characters away from and toward each other, said inking means including a plurality of contacting rollers one of which is an inking roller, members connected to the inking roller for rotating the latter, and means cooperating with said members for rotating the inking roller in the movement of the inking means out of operative position.

12. In a machine of the character described provided with an opening for insertion of a check, a frame having a forwardly extending base element, a bar operable in the opening and having stop elements for limiting insertion of the check, and a channel element rigid with the bar and fitting over the base element in snug contact therewith for supporting and guiding the bar and holding it in adjustment lengthwise of said base element.

13. In a machine of the character described, a fixed type bar, a plurality of type members having printing characters selectively alinable with the bar, a platen cooperating with and movable toward and away from the alined characters, said platen having serrations and the characters having serrations registering with the serrations of the platen for perforating the characters printed upon a check when the alined characters and the platen are moved into full operative relation, and a type plate mounted in the end of the bar for cooperation with the platen, the characters of the plate being serrated and the plate being movable in the bar for causing the serrations of the plate to register with the serrations of the platen.

14. In a machine of the character described, printing means including selectively alinable printing characters and a fixed type bar, a printing plate carried by the bar and mounted on the end thereof, and a platen cooperating with and movable toward and away from the plate and the characters, the platen being serrated and the characters and the plate being serrated, said plate being movable in the bar for causing the serrations of the plate to register with the serrations of the platen when said platen and the characters and the plate are moved into full operative relation.

15. In a machine of the character described, printing means including a fixed type bar, a printing plate, tongue and groove means slidably supporting the plate in the end of the bar, latch means releasably holding the plate in the bar while permitting limited movement of the plate relative to the bar, and a platen movable toward and away from the plate and having a serrated face with which the printing face of the plate cooperates.

16. In a machine for printing checks and similar instruments, type members bearing printing characters and relatively adjustable for selectively aligning the characters on a printing line of the machine, a platen movable toward and away from the characters aligned on said printing line, a fixed perforating plate parallel to and adjacent the printing line, a perforating member adjacent the platen and cooperating with said plate, a toggle mechanism, operating connections between said mechanism and the perforating member adjustable for optionally disabling and enabling the perforating member, an operating lever, operating connections between the lever and the toggle mechanism, and operating connections between the toggle mechanism and the platen for operating the latter after operation of the perforating member.

17. In a machine for printing checks and similar instruments, printing characters selectively alinable on a printing line of the machine for printing in the amount receiving space of a check, a perforating plate disposed to perforate the space of the check intended for reception of the payee's name, a platen movable toward and away from the alined characters, a perforating member cooperating with said plate, means for operating said member and the platen sequentially and with the completion of the operation of the perforating member occurring in advance of the completion of the operation of the platen, and means for optionally disabling and enabling the perforating member in any adjustment of the alined characters.

18. In a machine for printing checks and similar instruments, type members bearing printing characters and relatively adjustable for selectively aligning the characters on a printing line of the machine, a perforating plate adjacent and parallel to the printing line, a supporting shaft, an inner and an outer pair of arms mounted upon the shaft for rocking movement on the axis thereof, a platen carried by the inner pair of arms and cooperating with the aligned characters, a perforating member carried by the outer pair of arms and cooperating with said plate, and means for operating said pairs of arms sequentially and with the operation of the outer pair of arms occurring in advance of the operation of the inner pair of arms.

19. In a machine for printing checks and similar instruments, type members bearing printing characters and relatively adjustable for selectively aligning the characters on a printing line of the machine, a perforating plate adjacent and parallel to the printing line, a supporting shaft, an inner and an outer pair of arms mounted upon the shaft for rocking movement on the axis thereof, a platen carried by the inner pair of arms and cooperating with the aligned characters, a perforating member carried by the outer pair of arms and cooperating with said plate, means for operating said pairs of arms, and means for optionally enabling and disabling the arms carrying the perforating member.

In witness whereof, we hereunto subscribe our names this 20th day of June, 1931.

ARTHUR H. WOODWARD.
WILLIAM E. RICHMOND.